No. 859,344. PATENTED JULY 9, 1907.
R. SILVER.
CLOSED VEHICLE BODY.
APPLICATION FILED AUG. 28, 1906.
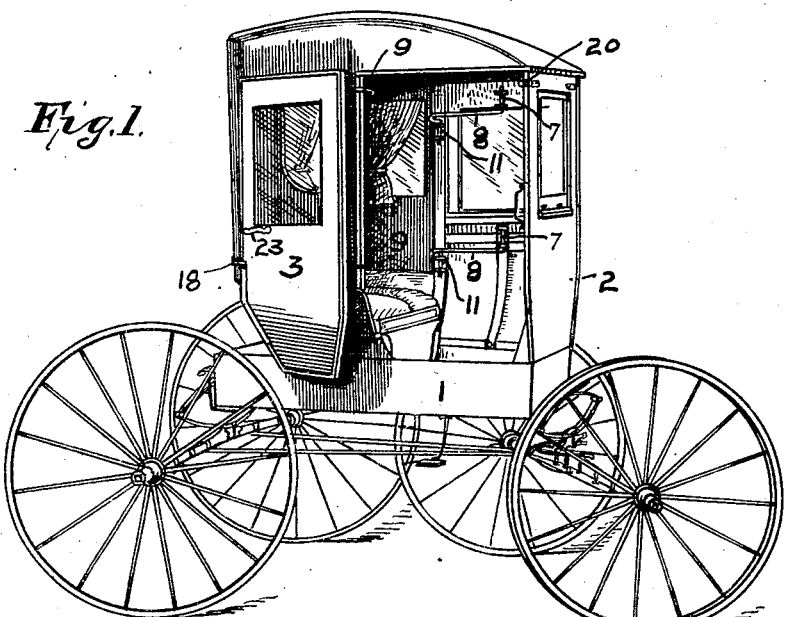
Witnesses:
L. B. Woerner
J. C. Dynn.
Inventor;
Robert Silver,
By Minturn T Woerner
Attorneys,

UNITED STATES PATENT OFFICE.

ROBERT SILVER, OF KNIGHTSTOWN, INDIANA, ASSIGNOR OF ONE-HALF TO MASON WALTERS, OF KNIGHTSTOWN, INDIANA.

CLOSED VEHICLE-BODY.

No. 859,344.      Specification of Letters Patent.      Patented July 9, 1907.

Application filed August 28, 1906. Serial No. 332,398.

*To all whom it may concern:*

Be it known that I, ROBERT SILVER, a citizen of the United States, residing at Knightstown, in the county of Henry and State of Indiana, have invented certain new and useful Improvements in Closed Vehicle-Bodies, of which the following is a specification.

This invention relates to improvements in vehicles having a closed body with suitable doors, and a front window which can be readily opened to permit the driving lines to be passed into the vehicle.

The object of the invention is to provide means for securing the doors to the vehicle body whereby they may be opened without interfering with the vehicle wheels, and will not require more space than ordinarily exists between the body and wheels of the vehicle.

The object further, is to provide a spring hinge-mechanism which will hold the door in closed position with a pressure that will take up any looseness between the door frame to prevent rattling.

The object of the invention also, is to provide means for fastening a top hinged front window so as to keep wind and rain from entering under it, and to provide a fastening means which can be quickly operated to release the window.

I accomplish the objects of the invention by the mechanism illustrated in the accompanying drawings, in which—

Figure 1 is a perspective view of a closed vehicle having doors and windows equipped with my invention, one of said doors being closed and the other, the near one, being in open position. Fig. 2 is a detail in horizontal section through the near side of the vehicle body and door, showing the door closed in full lines, and open in dotted lines, and also showing the door in two positions in dotted lines between the full-open and closed positions. Fig. 3 is a detail in perspective of the rear near side of a vehicle body with my improved door shown in open position therewith, the view being from a position in front looking toward the rear of the vehicle.

Like characters of reference indicate like parts throughout the several views of the drawings.

1 is a vehicle bed of any usual pattern, here shown as a piano box bed, and 2 is a rigidly built top which is preferably removable from the body by means of suitable attaching screws, which are not shown.

3 is the door which fits into the frame 4 around the opening in the side of the top 2 to close said opening. Secured to the inside of the rear member of the frame 4 are the brackets 5, here shown as two in number, placed adjacent to the top and bottom of the frame. Each of these brackets 5 has two horizontal ears which are perforated in vertical alinement with each other to receive the vertical inner ends 7 of the hinge-arms 8. The hinge-arms 8 are substantially horizontal and are formed next to the vertical ends 7 with the half circle bends 9 to prevent interference with the frame 4 when the door is open. The arms 8 extend approximately half the width of the door 3 and terminate with vertical ends 11. 12 are brackets with double vertically perforated ears, similar to the brackets 5, to receive the vertical ends 11 of the arms 8.

The door 3 is supported by the arms 8, attached in the manner above described, but so loosely that its movements would be too uncertain and erratic for practical purposes, and I therefore provide a holding and guiding device which I will now describe and which is one of the most important features of my invention.

14 is a stiff curved spring, one end of which is bolted to the side of the top 2. The outer end is bent to form an eye to receive the hinge-pin 16 by means of which pin the lever 17 is connected with the spring 14. The lever 17 is curved horizontally a quarter turn at its end opposite pin 16, and this bent end is hinged to the bracket 18 at the rear edge of the door 3.

The front door frame 4 has the stop-bars 20, the outer ends of which are bent slightly to the rear. These form stops for the door 3 to limit the forward movement of the door when the latter is closed, and the tension of the spring 14 is such as to press the door 3 hard against the stop 20. When the door 3 is drawn out past the dead center line from 16 to b, the tension of spring 14 will force the door into the position indicated in dotted lines at b—b in Fig. 2. The then position of spring 14 is indicated by the dotted lines in Fig. 2.

23 represents a handle for opening and closing the door 3, and when this is taken hold of and the door pressed from the position b—b, past the dead center line, above referred to, the tension of the spring 14 is exerted to close the door and push it in the direction of stop 20. It will be firmly held in closed position by the spring 14 so as to keep the door closed and to keep it from rattling.

Still referring to Fig. 2, when the door is moved toward the rear of the vehicle from position b—b, it will assume the position d—d parallel with the side of the vehicle but still covering part of the doorway. The next operation is to press the rear of the door inwardly so as to cause the door to assume the position c—c which is the full open position of the door. In this position it acts as a guard or fender to protect the garments of the person entering or alighting from the vehicle from contact with the rear wheel, and the above described mechanism permits the door to open freely without conflict with the wheel as would be inevitable were the door hinged in the ordinary way so as to swing back on vertical pins.

Having thus fully described my invention, what I claim as new and wish to secure by Letters Patent of the United States, is—

1. A vehicle body, a door therefor opening to the rear of the vehicle, an arm hinged at one end to the inside of said body and at its other end to the door between the edges of the door, and means comprising a plurality of substantially horizontal bars connected together, located wholly outside of the vehicle body, for controlling and guiding said door.

2. A vehicle body, a door therefor, a plurality of arms each having curved ends which are hinged to the inside of said body and at their other ends to the door between the edges of the latter, each of said arms being substantially horizontal and arranged in vertical series one above the other, and means comprising horizontal bars hinged together in pairs, located wholly outside of the vehicle body for controlling and guiding said door.

3. A vehicle body, a door therefor, an arm hinged at one end to the inside of said body and at the other end to the door between the edges of the door, a curved spring-bar secured rigidly to the outside of the body, and a lever connecting the free end of the spring-bar with the door.

4. A vehicle body, a door therefor, a stop to limit the forward movement of the door, an arm hinged at one end of the inside of said body and at its other end to the door intermediate of the edges of the door, said arm being curved at the end which is hinged to the body, a spring-bar secured in rigid position to the outside of the body, and a horizontal lever pivoted at its front end to the outside of the door and at its opposite end to the free end of the spring-bar.

5. A vehicle body, doors therefor, arms hinged at an end of each to the inside of said body and at their other ends to their respective doors between the edges of the latter, horizontal levers outside of the body pivoted at their front ends to their adjacent doors, and a spring-bar for each lever connecting the other end of the lever with the outside of the body.

6. A vehicle body, a door therefor, an arm hinged at one end to the inside of said body and at the other end to the door between the edges of the door, said arm being curved at the end next to the body, a curved spring-bar rigidly secured to the outside of the body, and a horizontal lever connecting the free end of the spring-bar with the outside of the door, the end of the lever being curved next to the door.

7. A vehicle body, a door therefor, arms hinged at each of their ends to the inside of said body and at their other ends to the inner side of the door, said arms being bent to prevent interference with the body on opening the door, and means wholly outside of the vehicle body for controlling and guiding said door, said means including a spring to hold the door closed with spring pressure to prevent rattling.

In witness whereof, I have hereunto set my hand and seal at Indianapolis, Indiana, this 7th day of Aug., A. D. one thousand nine hundred and six.

ROBERT SILVER. [L. S.]

Witnesses:
JOSEPH A. MINTURN,
F. W. WOERNER.